C. H. CARY.
Windmill.
No. 218,662.      Patented Aug. 19, 1879.
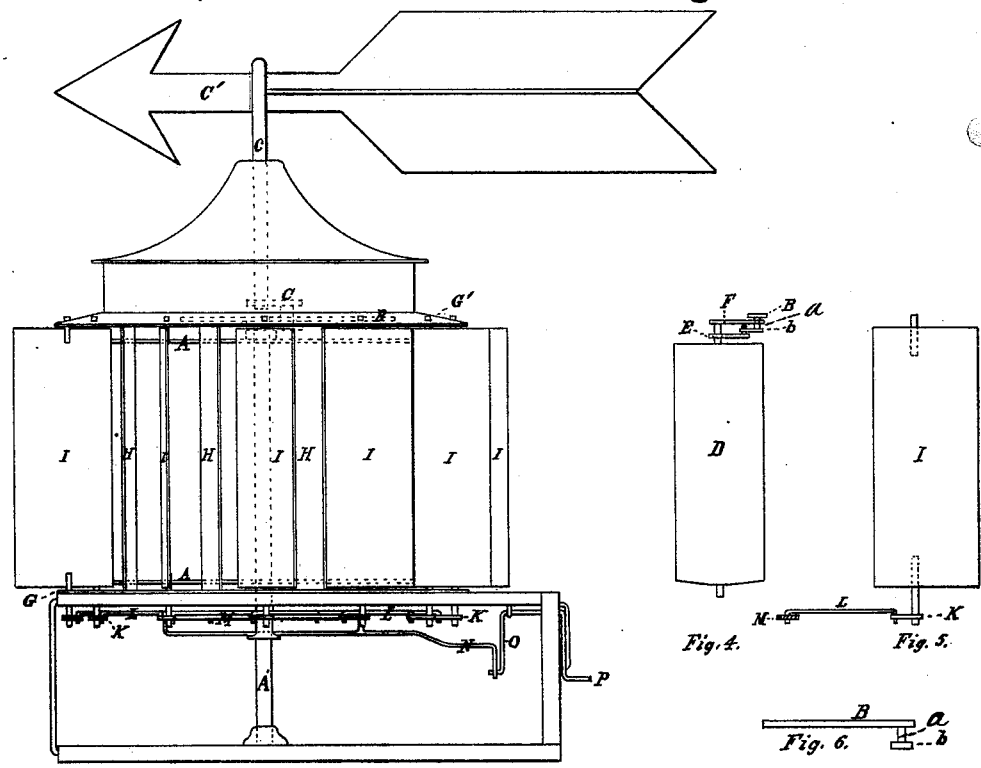
Fig. 1.
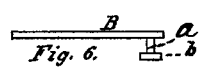
Fig. 4.      Fig. 5.
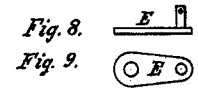
Fig. 6.
Fig. 8.     Fig. 7.
Fig. 9.
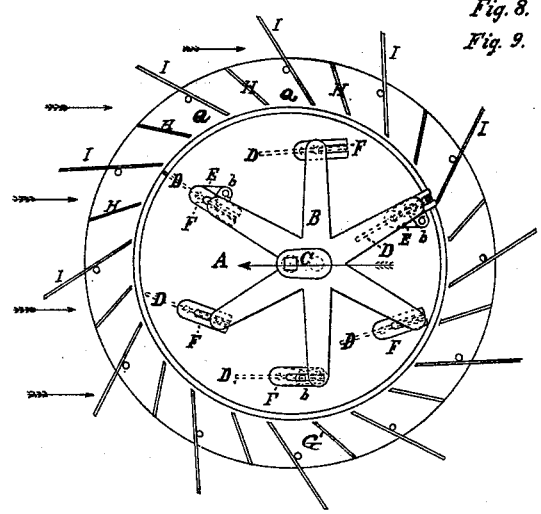
Fig. 2.
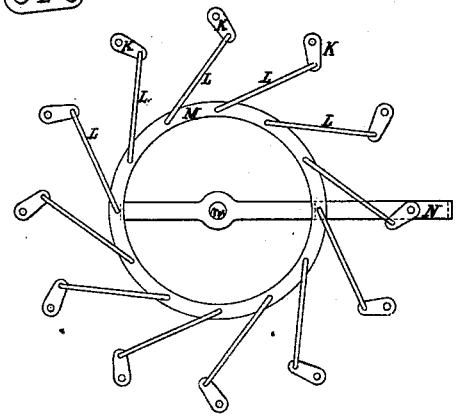
Fig. 3.
Witnesses.
Socrates Scholfield
John S. Barden
Inventor.
Charles H. Cary

UNITED STATES PATENT OFFICE.

CHARLES H. CARY, OF BRISTOL, RHODE ISLAND.

IMPROVEMENT IN WINDMILLS.

Specification forming part of Letters Patent No. 218,662, dated August 19, 1879; application filed October 4, 1878.

*To all whom it may concern:*

Be it known that I, CHARLES H. CARY, of Bristol, in the State of Rhode Island, have invented an Improvement in Windmills, of which the following is a specification.

The nature of my invention consists in a wind-wheel provided with pivoted vanes, connected to each other by means of a variable feathering mechanism, the relative action of which upon the vanes may be governed and controlled according to the varying direction of the wind, either by means of an attached wind-vane, or other suitable device, or by hand.

Figure 1 is a side elevation. Fig. 2 is a top view with the upper portion of the tower removed. Fig. 3 is a view showing the mechanism for operating the covers or gates of the wind-passages. Figs. 4, 5, 6, 7, 8, and 9 are detail views.

In the drawings, G and G' represent bottom and top pieces, to which the fixed guides H H are attached, so as to form the chutes or wind-passages Q Q around the periphery of the wind-wheel A. The pivoted gates I I serve to close the chutes Q Q, for the purpose of protecting the wind-wheel from the force of the wind when desired, and for regulating the speed of the wheel.

To the lower end of the pivots of the gates I I are attached the cranks K K, which are connected by the rods L L to the ring M, which is operated around a fixed center, $m$, by means of a lever, N, which may be readily operated by means of a crank, O, and handle P, or by any other suitable means.

When the mill is to be self-regulating, I attach a governor or regulator to act upon the lever N, so as to open or close the gates I I, as desired.

The vanes D D are loosely pivoted between the two heads of the wheel A, and have attached to their upper pivots the slotted arms F F, which severally receive the wrist-pins $a$ $a$ $a$ of the spider B. To the lower end of the wrist-pin is attached the fixed arm $b$, from which connection is made with the pivot of the vanes D D by means of the loose connecting-rods E E E.

The crank C is loosely placed at the upper end of the shaft of the wheel A, and also passes loosely through the center of the spindle B. The shaft $c$, passing downward from the wind-vane C', enters a square hole in one arm of the crank C, exactly in line with the axis of the wheel A, by which means the relative position of the crank C will be entirely governed and controlled by the position of the vane C'. Thus the position of the spider, being controlled by the vane independent of the revolution of the wheel A, will cause the vanes D D to receive a feathering movement as they revolve, as shown by the dotted lines in Fig. 2, where the exterior arrows show the direction of the wind, and the interior arrow the position of the controlling wind-vane C'. The two forward vanes are inclined in one direction, and the two rear vanes are inclined in the opposite direction, while the side vanes are nearly feathered in the direction of the wind. The wind will thus have a double action in the same direction on the front and rear vanes, so as to cause the wheel to revolve rapidly.

The specific arrangement of the fixed guides H H, fastened to the circular pieces G and G', serves to impart strength and rigidity to the outer structure, and the whole, when placed upon the roof of a building, presents a desirable and handsome appearance.

Heretofore, in wind-wheels furnished with pivoted vanes, the vanes have been made to revolve continuously in one direction with one-half the speed of the wheel to which they are attached, whereby the opposite edges of the vanes are alternately presented to the action of the wind, whereas by my improvement the vanes always present the same edge to the wind, and do not revolve as they move around with the wheel, but have a simple vibrating movement imparted to them by means of a centrally-arranged crank, eccentric, or cam.

I claim as my invention—

1. The pivoted vanes of the wheel, combined with a feathering mechanism made changeable in its relative point of action on the vanes by means of the crank C, substantially as described.

2. The pivoted vanes of the wheel, combined with a variable feathering mechanism, controlled in its proper specific point for action on the vanes of the wheels by means of a crank, C, directing wind-vane C', substantially as described.

3. The combination of the wheel A, pivoted vanes D, slotted arms F, cranks b, connecting-bars E, spider B, and crank C, substantially as described.

4. A wind-wheel provided with longitudinally-arranged pivoted vanes, made to vibrate back and forth upon their pivots by means of mechanism arranged substantially as described, so as to present the same forward edge to the wind for a complete revolution of the wheel.

CHARLES H. CARY.

Witnesses:
SOCRATES SCHOLFIELD,
JOHN S. BARDEN.